US006830122B2

(12) United States Patent
Kroppe

(10) Patent No.: US 6,830,122 B2
(45) Date of Patent: Dec. 14, 2004

(54) VEHICLE YAW MANAGEMENT SYSTEM WITH DRIVELINE TORQUE CONTROL

(75) Inventor: William J. Kroppe, Ann Arbor, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/374,402

(22) Filed: Feb. 26, 2003

(65) Prior Publication Data

US 2004/0163856 A1 Aug. 26, 2004

(51) Int. Cl.[7] .............................................. F16H 48/04

(52) U.S. Cl. ......................... 180/197; 180/248; 475/86; 701/69

(58) Field of Search ................................. 180/197, 248, 180/249; 475/86, 87, 88; 701/96

(56) References Cited

U.S. PATENT DOCUMENTS

| 5,370,588 | A | * | 12/1994 | Sawase et al. ................ 475/84 |
| 5,388,658 | A | * | 2/1995 | Ando et al. .................. 180/197 |
| 5,456,641 | A | * | 10/1995 | Sawase ......................... 475/86 |
| 5,927,425 | A | * | 7/1999 | Kusano ....................... 180/248 |
| 6,295,487 | B1 | | 9/2001 | Ono et al. |
| 6,361,123 | B1 | * | 3/2002 | Hamilton ................... 303/9.68 |
| 6,564,140 | B2 | * | 5/2003 | Ichikawa et al. ............. 701/91 |

* cited by examiner

Primary Examiner—Lesley D. Morris
Assistant Examiner—Tony Winner
(74) Attorney, Agent, or Firm—MacMillan, Sobanski & Todd, LLC

(57) ABSTRACT

A yaw management system for a vehicle with driveline torque control is comprised of sensors to determine the rate of change of yaw in the vehicle, a controller for receiving information from the sensors, and a means for using that information to selectively transfer torque from the inner half shaft axles of the vehicle to the outer half shaft axles of the vehicle for regulating the torque delivered to the drive wheels.

12 Claims, 7 Drawing Sheets

MODES OF OPERATION

| OPERATIONAL MODE | CENTER CLUTCH STATUS | LEFT CLUTCH STATUS | RIGHT CLUTCH STATUS |
|---|---|---|---|
| NORMAL FORWARD MOTION | DISENGAGED | ENGAGED | ENGAGED |
| VEHICLE FRONT END SLIPPING TO LEFT | ENGAGED | ENGAGED | DISENGAGED |
| VEHICLE FRONT END SLIPPING TO RIGHT | ENGAGED | DISENGAGED | ENGAGED |

FIG. 3

VEHICLE YAW MANAGEMENT SYSTEM WITH DRIVELINE TORQUE CONTROL

BACKGROUND OF THE INVENTION

This invention relates to a method and apparatus for controlling the yaw response of a vehicle as it negotiates a turn. More specifically, it relates to a yaw management system that uses driveline torque control to manage the handling capabilities of the vehicle.

A vehicle is subjected to many different degrees of free movement. In most analyses, these degrees of movement are characterized as movements about three perpendicular axes, namely, rolling movement about an axis extending from front to rear through the vehicle, pitching movement about an axis extending from left to right through the vehicle, and yawing movement about an axis extending from top to bottom through the vehicle. The yawing movement of a vehicle is usually encountered when the vehicle is negotiating a turn or as vehicle looses control from loss of traction as it enters into an uncontrolled spin. The yaw is described as the angle of change from initial orientation to subsequent orientation and can be measured in terms of degrees. The yaw rate is the angular change over time, usually measured in terms of degrees per unit time. Vehicle yaw rate increases as a vehicle enters a curve or spin and then decreases as the vehicle alignment is straightened.

Recently, traction control devices have been created to adjust the yaw response of a vehicle by limiting the rotational velocity at the wheels of the vehicle. Traction control is a known system in which a device is used to control the traction of a vehicle under different road conditions. Traction control is accomplished, for example, by providing a braking system that restricts the rotational speed of any particular wheel of the vehicle. A typical braking traction control system works like an antilock braking system (ABS) in reverse. ABS is a known braking system that electronically monitors vehicle wheel speed and accordingly regulates hydraulic pressure to the brakes to maximize braking power and prevent the wheels from locking. Braking traction control systems use ABS components, except that the brakes are applied to prevent a wheel from spinning rather than preventing a wheel from locking.

Although braking traction control systems have some value, it would be desirable to develop an improved yaw management system.

SUMMARY OF THE INVENTION

According to this invention there is provided a yaw management system for a vehicle including two drive wheels, each connected to a differential by a right half axle and a left half axle, and a prop shaft to supply rotative force to the differential. Also provided is a yaw sensor for sensing the rate of change of yaw of the vehicle, and a torque transfer apparatus for selectively transferring the torque from the differential to the right half axle and left half axle. A controller is provided to receive information from the yaw sensor and to control the torque transfer apparatus in response to the information from the yaw sensor.

According to this invention there is also provided a yaw management system for a vehicle including two drive wheels, each connected to a differential by a right half axle and a left half axle, and a prop shaft to supply rotative force to the differential. Also provided is a yaw sensor for sensing the rate of change of yaw of the vehicle, and a steering wheel angle sensor for sensing the steering angle. A torque transfer apparatus for selectively transferring the torque from the differential to the right half axle and left half axle is also provided. A controller is provided to receive information from the yaw sensor and the steering wheel angle sensor to control the torque transfer apparatus in response to the information from the sensors.

According to this invention there is also provided a yaw management system for a vehicle including two drive wheels, each connected to a differential by a right half axle and a left half axle, and a prop shaft to supply rotative force to the differential. Also provided is a yaw sensor for sensing the rate of change of yaw of the vehicle, and a speed sensor for sensing the speed of the vehicle. A torque transfer apparatus for selectively transferring the torque from the differential to the right half axle and left half axle is also provided. A controller is provided to receive information from the yaw sensor and the steering speed sensor to control the torque transfer apparatus in response to the information from the sensors.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a table that illustrates a programming scenario for the yaw management system of the invention.

DETAILED DESCRIPTION OF THE INVENTION

Figure 1:
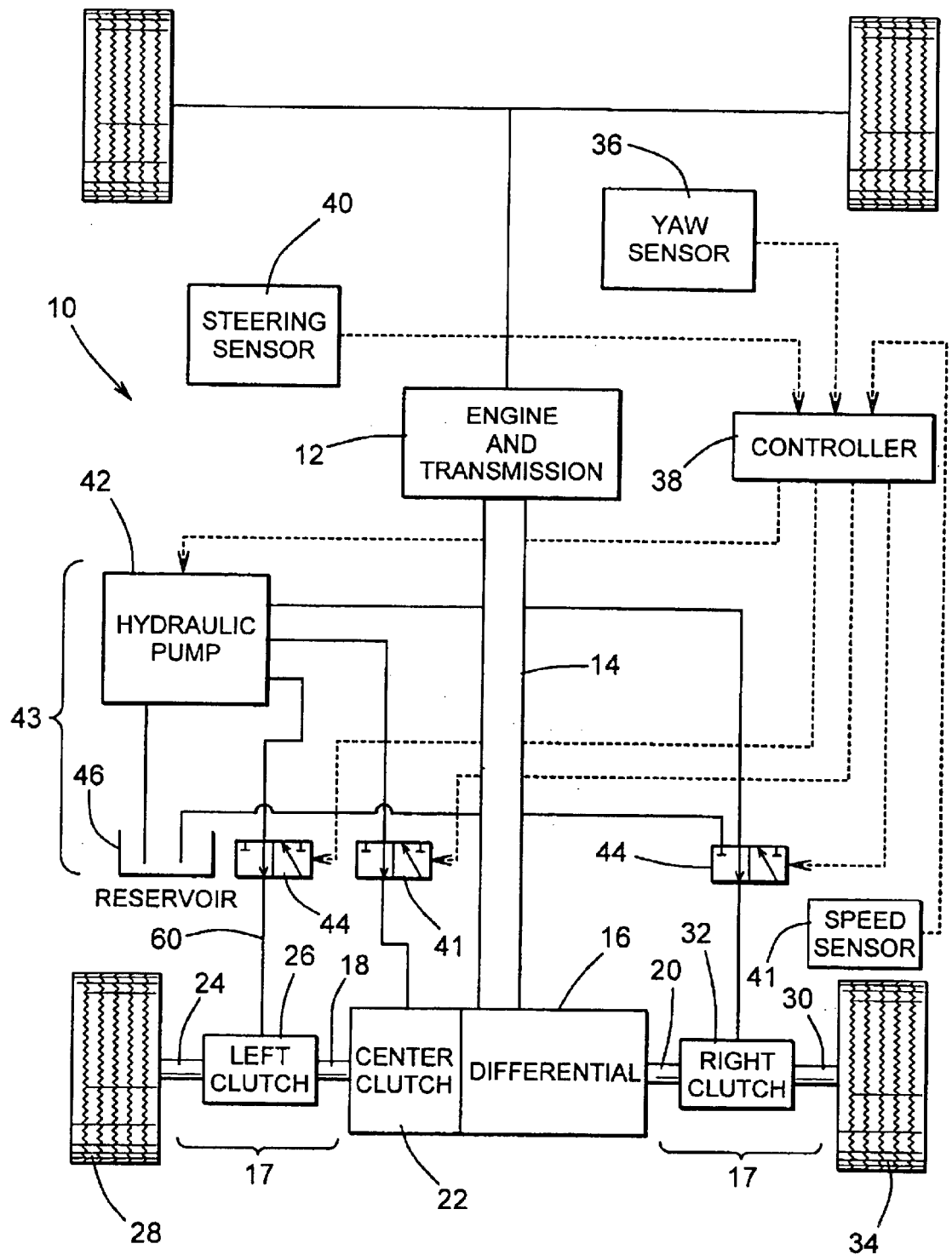
FIG. 1 is a schematic plan view of a vehicle driveline having a yaw management system according to the invention.

FIG. 1 is a plan view of a vehicle driveline equipped with a yaw management system according to the invention. As illustrated in FIG. 1 a drive train assembly, indicated generally at 10, for a vehicle is adapted to transmit rotational power from a source of rotational energy, such as an engine/transmission assembly 12. The engine/transmission assembly 12 transfers rotational force to the prop shaft 14, which in turn transmits rotative force to the differential 16. The differential 16 can be any suitable mechanism to convert rotative force of the prop shaft 14 into rotative force applied to the rear wheel axle assemblies 17. The rear wheel axle assemblies 17 include a left inner half shaft axle 18 and a right inner half shaft axle 20. The differential 16 applies torque to the left inner half shaft axle 18 and the right inner half shaft axle 20 at a rate controlled by the differential 16. In the preferred embodiment, the differential 16 is a limited slip differential that includes a center clutch 22. The center clutch 22 is a device that transfers torque to both wheels in a vehicle when one wheel is slipping. Thus, the center clutch 22 ensures that both the left inner half shaft axle 18 and the right inner half shaft axle 20 are rotated when one wheel looses frictional contact with the pavement. The center clutch 22 may be a spring-pack clutch, cone clutch, disc clutch, hydraulic clutch, or other clutch designs known in the art, but also may consist of a viscous coupling where fluid viscosity is regulated by a controller.

The left axle assembly 17 includes left outer half shaft axle 24, and the right axle assembly 17 includes a right outer half shaft axle 30. The torque from the left inner half shaft axle 18 is selectively applied to the left outer half shaft axle 24 by regulating the slip in the left clutch 26, which in turn selectively regulates the velocity of the left wheel 28. Similarly, the torque from the right inner half shaft axle 20 is selectively applied to the right outer half shaft axle 30 by regulation of the slip in the right clutch 32 which selectively regulates the velocity of the right wheel 34. The clutches may be of wet clutch design or dry clutch design. A wet clutch contains clutch oil for quicker heat dissipation. A dry clutch does not rely on oil for heat dissipation. Although the left and right wheels 28, 34 are shown as single wheels, it is to be understood they can be formed with multiple wheels, such as double wheels.

The drive train assembly 10 includes a yaw sensor 36 to measure the yaw moment or yaw rate of the vehicle and transmit the data to a controller 38. A number of operating conditions that may affect the yaw rate of the vehicle may also be monitored using remote sensors. For example, a steering wheel angle sensor 40 may be used to determine the steering angle of the vehicle at any given moment. A speed sensor 41 may be used for monitoring the speed of the vehicle or of any single operating wheel, such as wheels 28 and 34. Other remote sensors, not shown, may be added to sense the status of the throttle, clutch, gearshift, brakes, or other important vehicle operating inputs.

The controller 38 receives information from the yaw sensor 36, and optionally, from other sensors. The controller 38 then uses the information to control a hydraulic system 43 to selectively transfer torque from the inner half shaft axles 18, 20 to the outer half shaft axles 24, 30. The hydraulic system 43 is a torque transfer apparatus. FIG. 1 shows that the hydraulic system 43 includes a hydraulic pump 42 that circulates hydraulic fluid from a fluid reservoir 46 to selectively engage the left clutch 26 and right clutch 32, as well as the center clutch 22 of the differential 16. The output from the controller 38 regulates shuttle valves 44 to control the fluid pressure applied to each clutch 22, 26, 32 from the hydraulic pump 42.

Figure 2:
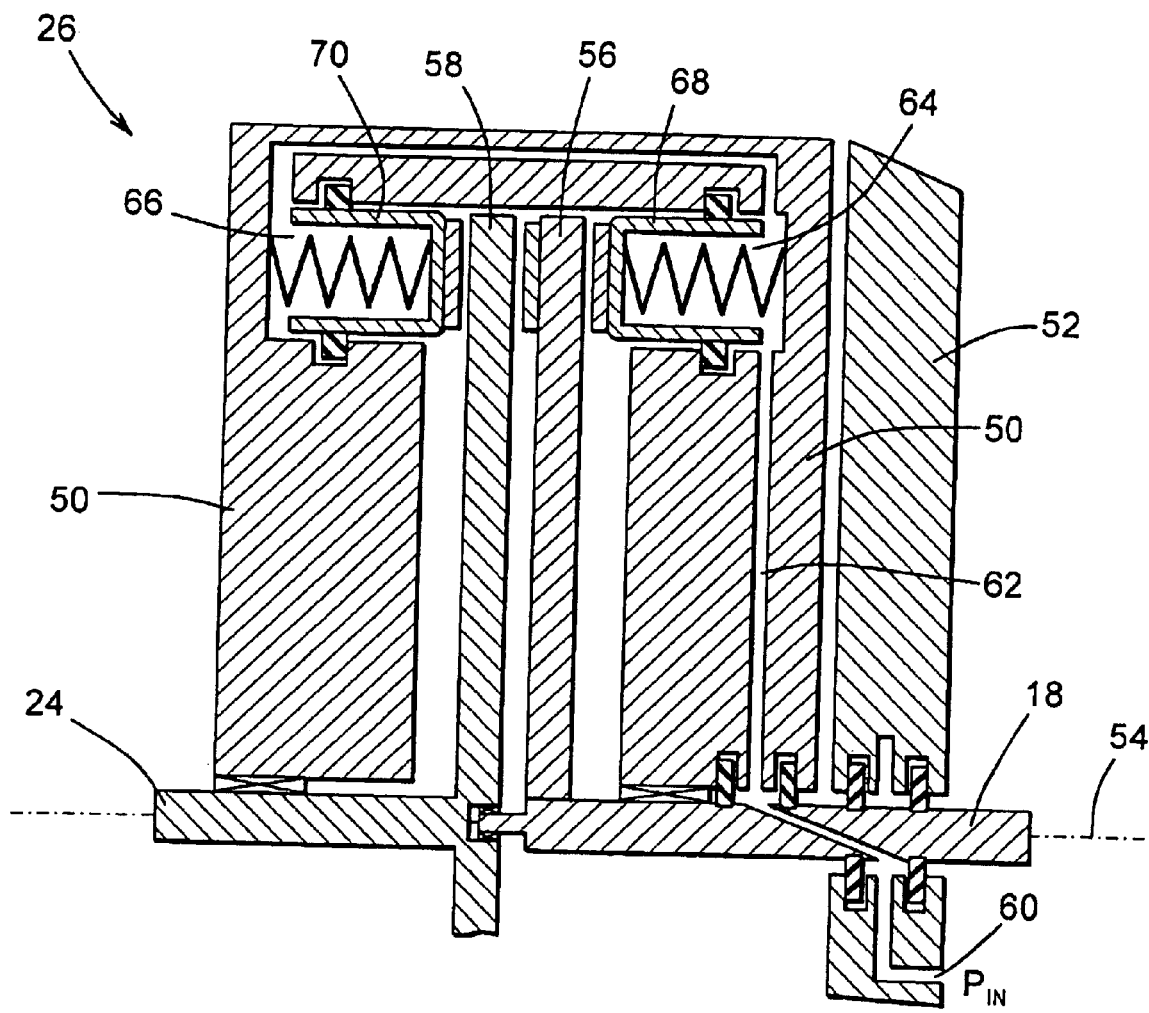
FIG. 2 is a sectional view of the left hydraulic clutch assembly of the driveline shown in FIG. 1.

FIG. 2 is a schematic view of a hydraulic clutch that may be used as the left clutch 26 and right clutch 32 of the yaw management system shown in FIG. 1. Although the drawing is in reference to the left clutch 26, the operating mechanisms for the left clutch 26 and the right clutch 32 are similar and FIG. 2 may be considered representative of either axle clutch. The left clutch 26 includes a clutch housing 50 that is connected to the axle housing 52, both of which are located concentrically about a center axis 54. The left inner half shaft axle 18 transcends through the axle housing 52 and clutch housing 50 at center axis 54. An inner clutch disk 56 is attached to the inner half shaft axle 18 to transfer rotational energy from the inner half shaft axle 18 to the inner clutch disk 56. An outer clutch disk 58 is affixed to the outer half shaft axle 24 so the outer half shaft axle 24 will rotate at the same speed as the outer clutch disk 58.

In a hydraulically activated system, the inner clutch disk 56 and outer clutch disk 58 are engaged when the shuttle valve 44 is activated by the controller 38 to allow hydraulic fluid to enter the fluid entry line 60. Hydraulic fluid flows from the fluid entry line 60 into fluid line 62 where it enters piston cavities 64 and 66, forcing movement of pistons 68 and 70 located within the cavities. An increase in the fluid pressure causes inner clutch disk 56 to be pushed toward outer clutch disk 58 by movement of the inner piston 68 in piston cavity 64. Meanwhile, the outer clutch disk 58 is also pushed toward the inner clutch disk 56 by movement of the outer piston 70 in piston cavity 66. The hydraulic force on the pistons controls the amount of slip between the inner clutch disk 56 and the outer clutch disk 58. The clutch slip may be regulated to achieve anywhere from zero slip to full slip between the disks.

As illustrated in FIG. 1, the slip between the two axle clutches 18, 20 and the differential center clutch 22 is regulated by a hydraulic system 43 using output from controller 38. As previously mentioned, the controller 38 may receive input from the yaw sensor 36 and several other sensors to monitor the operating parameters of the vehicle. If the vehicle begins to loose control and spin to the left, for example, the yaw sensor 36 can detect the change in yaw rate and adjust the torque applied to each of the rear wheels 28, 34 to compensate and correct the yaw rate. The specific programming for the controller 38 will vary depending on the make of the vehicle and the features included on the vehicle. However, a typical output scenario from the controller for various operating modes of the vehicle is summarized in a table shown in FIG. 3.

The table in FIG. 3 describes the operating status for the clutch system shown in the preferred embodiment of FIG. 1. The vertical portion of the table describes three possible vehicle operating conditions which include a vehicle in normal forward motion, a vehicle with the front end slipping to the left, and a vehicle with the front end slipping to the right. The horizontal portion of the table shows the operating status of the center clutch 22, left clutch 26, and right clutch 32.

When a vehicle is operating in normal forward motion without loss of traction at the wheels, the center clutch 22 is disengaged so as to minimize unnecessary friction at the differential 16, thereby maximizing fuel efficiency. In this mode of operation, the left inner half shaft axle 26 and the right inner half shaft axle 20 travel at the same rotational velocity, therefore, the left clutch 26 and right clutch 32 are fully engaged.

However, if the front end of the vehicle begins to slip to the left while the vehicle is in forward motion, the controller 38 will sense the change in yaw rate at the yaw sensor 36. The controller 38 will then use hydraulic, electrical, or other means to engage the center clutch 22 of the limited slip differential 16. The center clutch 22 applies frictional force to side gears, not shown, inside the differential 16 so torque can be effectively applied to the left clutch 26 while the right clutch 32 is disengaged. In this operating mode, the torque to the right rear wheel 34 is removed while torque is applied exclusively to the left rear wheel 28 so the front of the vehicle will be pushed to the right to correct and realign the vehicle.

Similarly, if the front end of the vehicle begins to slip to the right while the vehicle is in forward motion, the controller 38 will engage the center clutch 22 of the limited slip differential 16. The center clutch 22 applies frictional force to the side gears inside the differential 16 so torque can be effectively applied to the right clutch 32 while the left clutch 26 is disengaged. In this operating mode, the torque to the left rear wheel 28 is removed while torque is applied exclusively to the right rear wheel 34, thus allowing the right rear wheel 34 to push the front end of the vehicle back into alignment.

Many other sensor inputs may be used to alter the programming scenarios, such as simultaneous monitoring of the steering wheel angle or wheel speed, without departing from the scope of the invention. A steering wheel sensor 40 is a sensor that monitors the turning angle of a vehicle based on the extent of angular rotation that a steering wheel makes during a turn. Steering wheel sensors commonly include rotary potentiometer devices, but other devices may be used such as magnetoresistive sensors, optoelectronic sensors, and other similar devices. A wheel speed sensor 41 is a device that monitors the rotating speed of a wheel. The wheel speed sensor 42 can be a gear tooth speed sensor, rotary potentiometer device, or other similar speed sensing sensor.

The steering wheel sensor 40 can be used in combination with the yaw sensor 36 to sense when a vehicle is being over-steered or under-steered during a turn by comparing the vehicle yaw rate to the steering wheel angle. For example, if the steering wheel sensor 40 indicates that a vehicle should be turning left ten degrees per second, but the yaw sensor 36 indicates that the vehicle is turning 20 degrees per second, then over-steering is occurring and the yaw management system must compensate by disengaging the right clutch 32, while maintaining power to the left wheel 28 through the left clutch 26. Similarly, if the steering wheel sensor 40 indicates that the vehicle should be turning left 20 degrees per second, but the yaw sensor 36 indicates that the vehicle is turning only ten degrees per second, then under-steering is occurring and the yaw management system must compensate by disengaging the left clutch 26.

Figure 4:
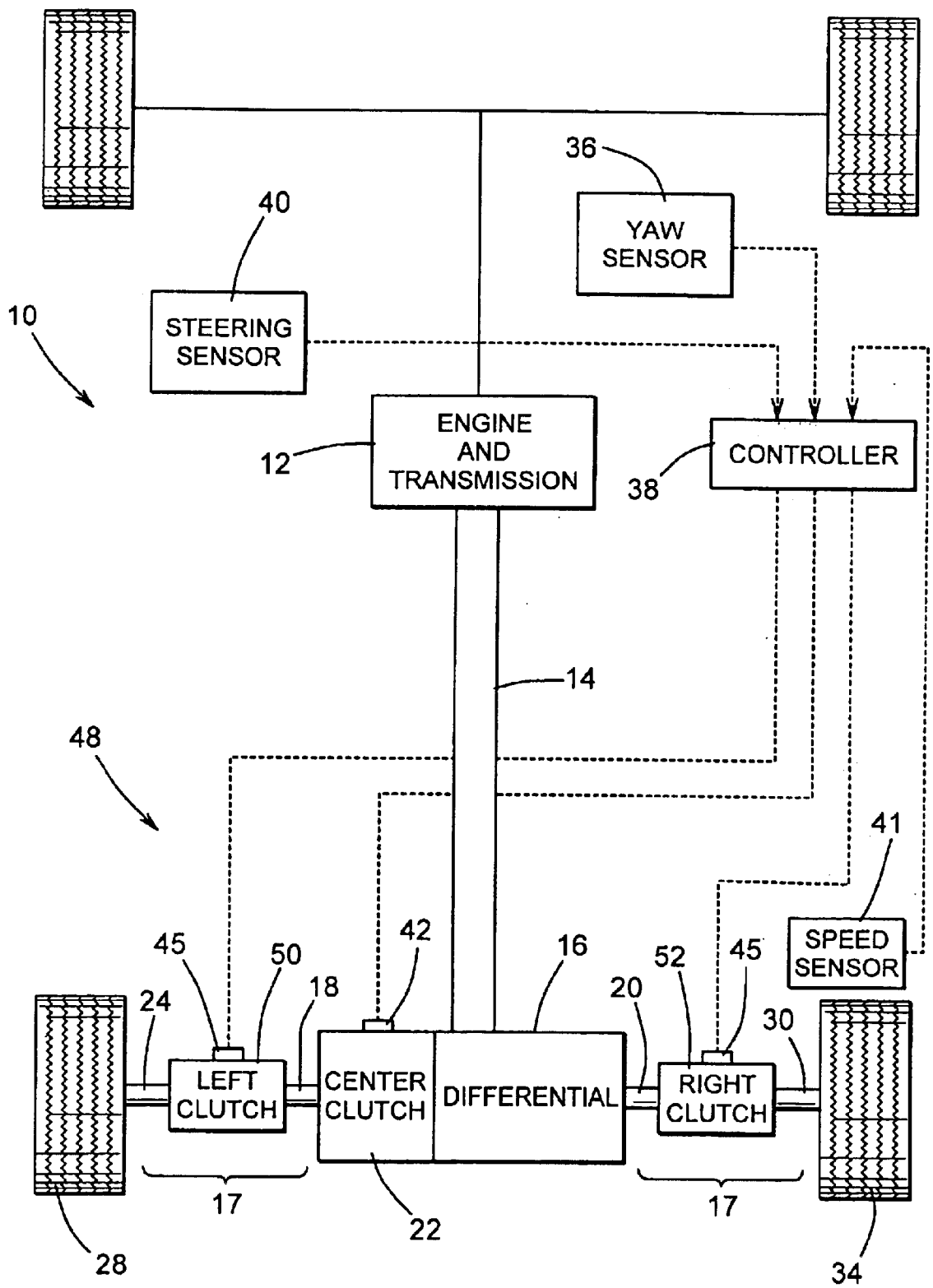
FIG. 4 is a schematic view of a second embodiment of the invention wherein a vehicle driveline includes electrically operated left and right clutches at each half axle to control the torque delivered to each of the rear wheels of the vehicle.

The programming of the yaw management system shown in FIG. 3 using the sensor systems and controller shown in FIG. 1 is only one embodiment of the invention. Although FIG. 1 illustrates a hydraulic system for controlling the clutch, other regulating means, such as an electronic control unit can be used. As shown in FIG. 4, the yaw management system 10 can be provided with a torque transfer apparatus that is comprised of an electronically controlled clutch system, indicated at 48, rather than a hydraulically controlled clutch system. FIG. 4 is similar to FIG. 1 except that electronic actuators 45 are used to engage left and right electronic clutches 50 and 52, respectively, when an electronic signal is delivered from the controller 38. The electronic signal from the controller 38 may selectively engage the left clutch 50 and right clutch 52, as well as a center clutch 22 of a limited slip differential. The clutch slip may be regulated to achieve anywhere from zero slip to full slip between the disks.

Figure 5:
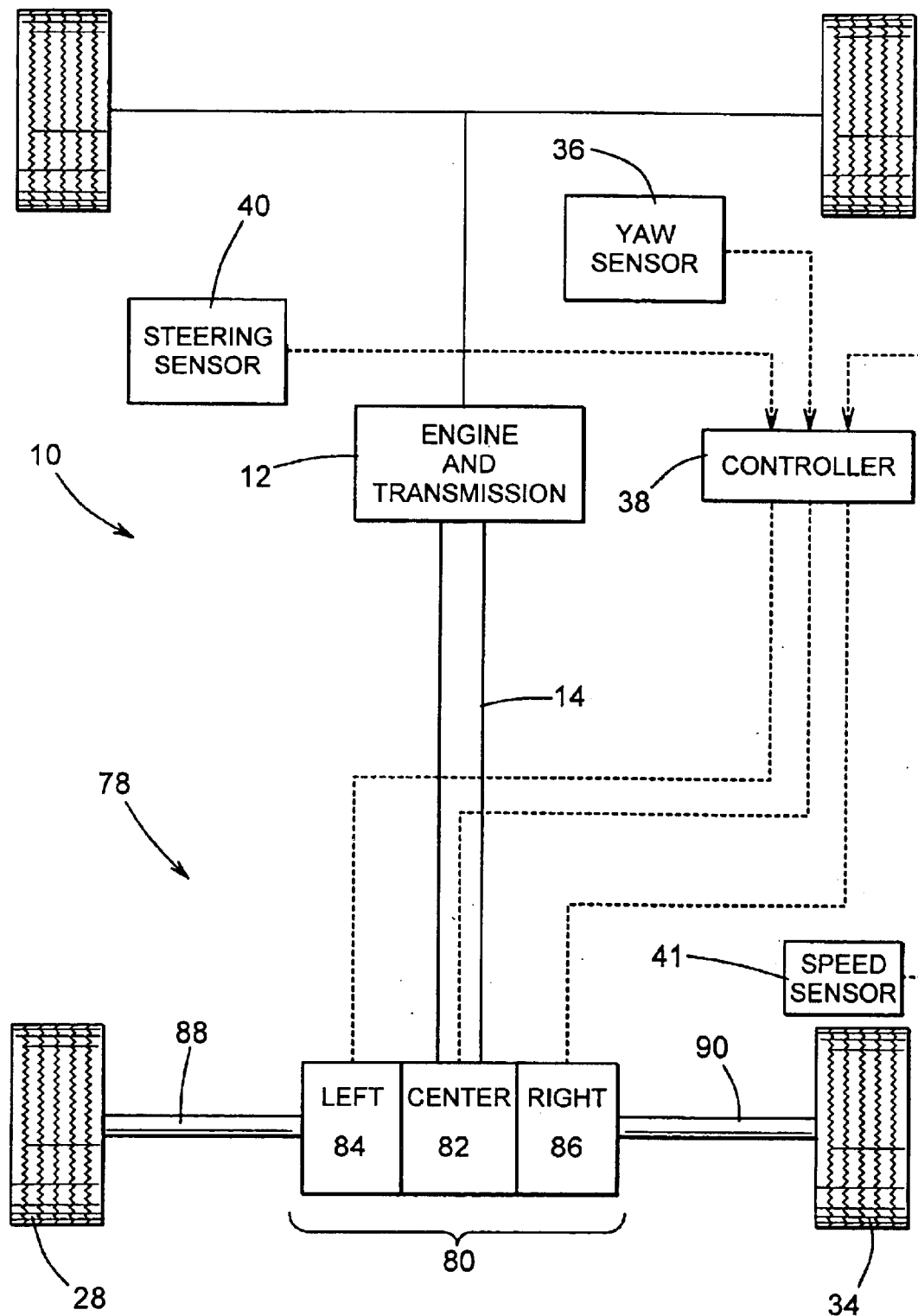
FIG. 5 is a partial schematic plan view of an alternate embodiment of a vehicle driveline having a yaw management system according to the invention.

Another embodiment of the yaw management system is shown in FIG. 5, where the yaw management system includes a torque transferring apparatus 78 that includes a differential 80 having a center clutch 82, a left clutch 84, a right clutch 86, a left half axle 88 and a right half axle 90. The operating principles of the system are similar to those previously described, except the need for an inner and outer half shaft is eliminated by directly transferring torque from center clutch 82 to the left clutch 84 and right clutch 86 to selectively apply torque to the left half axle 88 and the right half axle 90.

Figure 6:
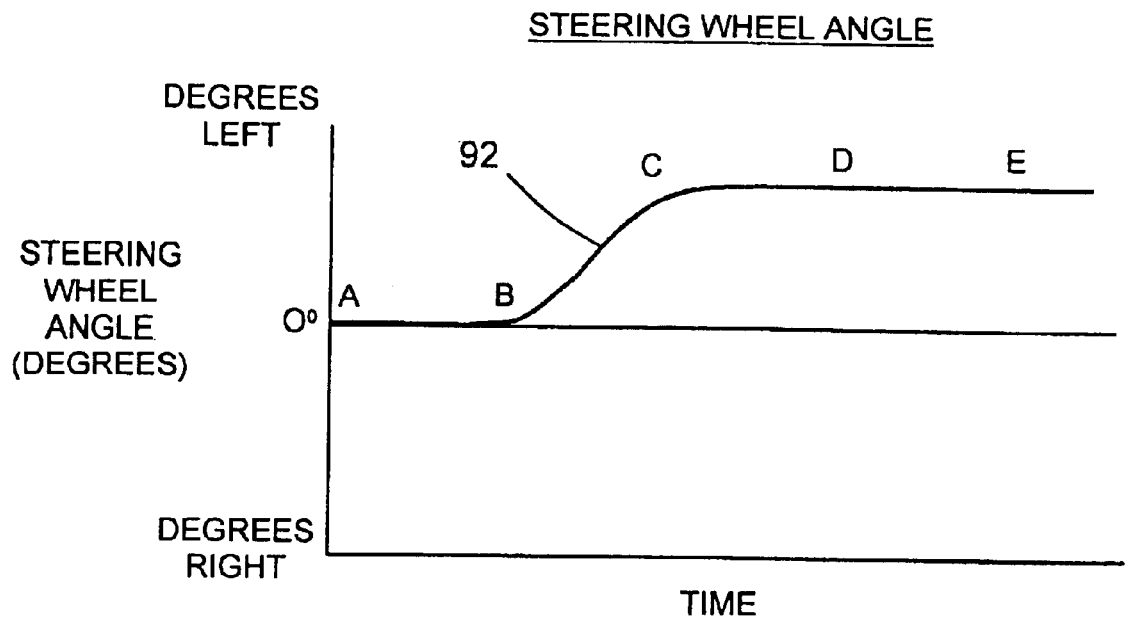
FIG. 6 is a graph of the steering wheel angle of a vehicle in a turn as a function of time.

FIGS. 6 through 9 illustrate graphically how the yaw management system would function in a system that includes a yaw sensor 36 and steering wheel sensor 40 while the vehicle is engaged in a turn. FIG. 6 is a graph 92 showing the steering wheel angle of a vehicle engaged in a left turn as a function of time. The steering wheel angle is at zero at the left side of the horizontal axis at time zero (A) prior to the vehicle's beginning to make a turn. As the vehicle begins to make the left turn (B), the steering wheel angle changes in the direction of the turn, and the steering wheel angle is maintained at that steering angle at time (C) through time (E). The angle is measured with respect to the original direction of the vehicle.

Figure 7:
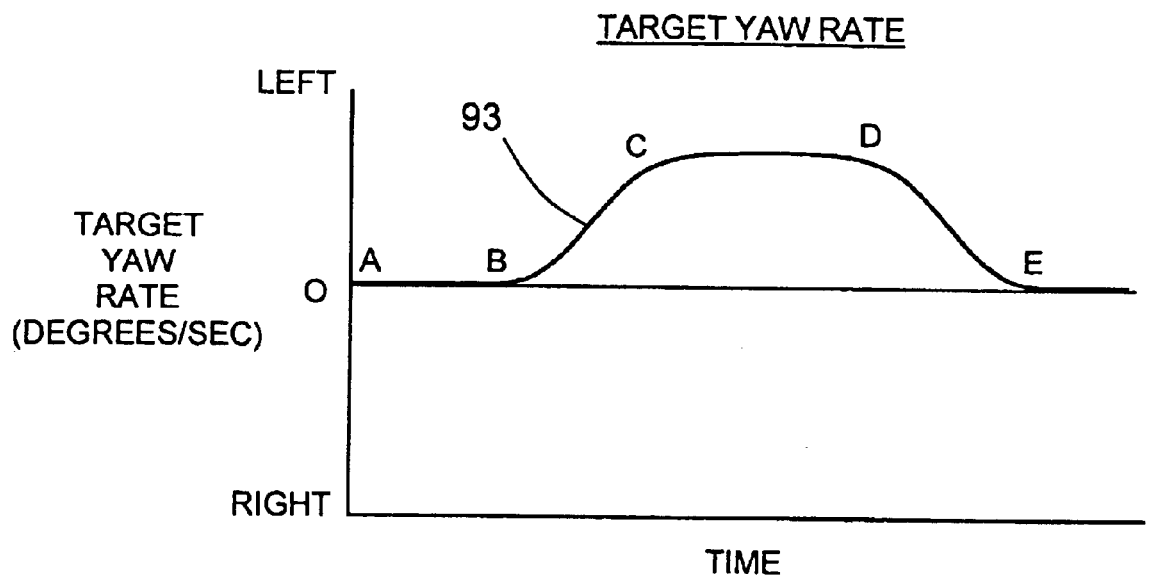
FIG. 7 is a graph of the target yaw rate as a function of time during the turn illustrated in FIG. 6.

FIG. 7 is a graph 93 showing the target yaw rate anticipated in the turn illustrated in FIG. 6 as a function of time. The yaw rate is driven by the steering wheel angle, and the target yaw rate is the projected yaw rate of a perfectly responding vehicle as a function of steering wheel angle. At time zero (A), the vehicle has not started its turn so the target yaw rate is at zero. As the vehicle enters the turn (B), the target yaw rate of the vehicle increases in proportion to the rate at which the steering wheel angle is changed. When the steering wheel is maintained at a constant steering angle throughout the turn (C) to (D), the target yaw rate of the vehicle should also remain constant as the vehicle changes its direction at a constant rate. As the vehicle completes the turn (E), the yaw rate of the vehicle approaches zero as the vehicle is no longer changing direction as a function of time.

Figure 8:
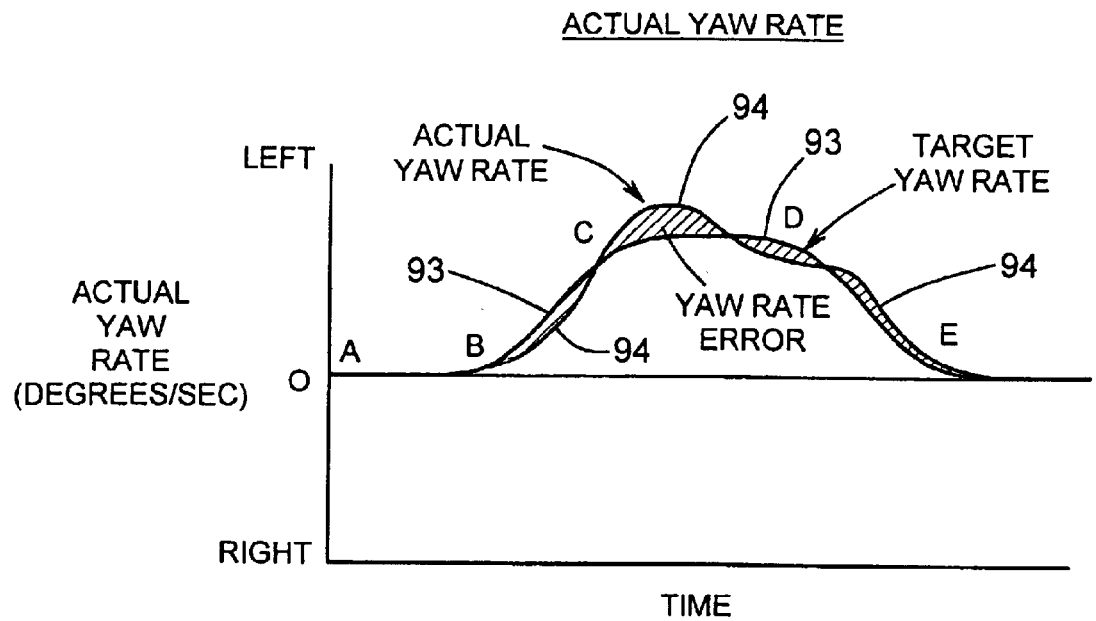
FIG. 8 is a graph of the actual vehicle yaw rate that may occur as a function of time in the turn illustrated in FIG. 6

FIG. 8 is a graph 94 of the actual vehicle yaw rate that may occur as a function of time during the turn illustrated in FIG. 6, as illustrated in graph 93 of the target yaw rate. At time zero (A), the vehicle has not started its turn so the target yaw rate and actual yaw rate are at zero. FIG. 8 shows that the actual yaw rate of the vehicle is less than the target yaw rate during the early part of the turn at time (B) as the vehicle is under-steered. While in the turn at time (C), the vehicle may slip and over-steer, causing the actual yaw rate to exceed the target yaw rate. As shown in FIG. 8, the actual yaw rate 94 may decrease to less than the target yaw rate 93 at time (D) from corrective action before approaching the target yaw rate 93 as the turn is completed at time (E). The difference between the target yaw rate and the actual yaw rate is known as the yaw rate error and is shown as the shaded portion of the graph in FIG. 8.

Figure 9:
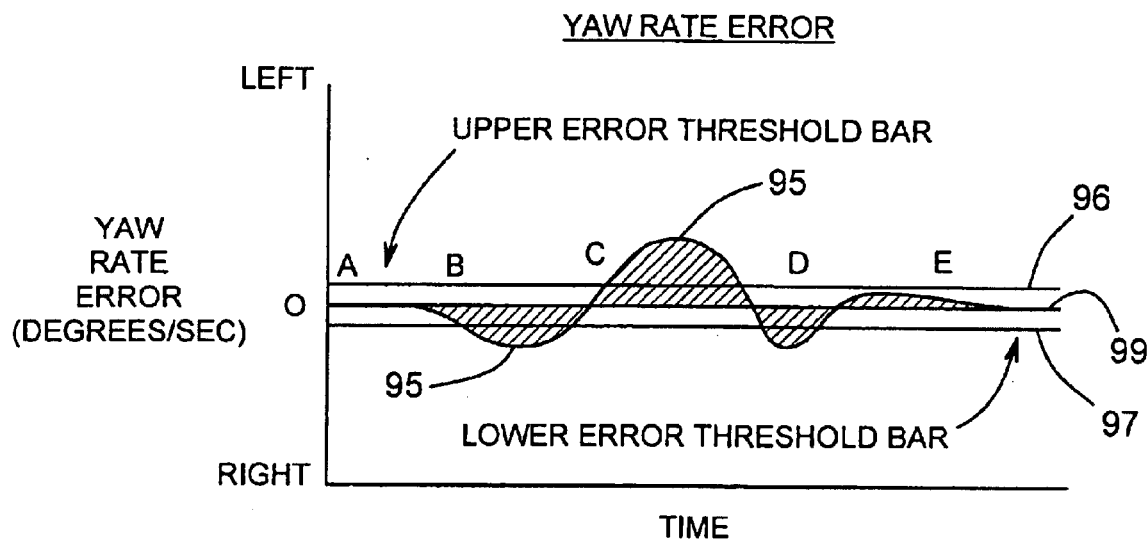
FIG. 9 is a graph of the yaw rate error as a function of time during the turn illustrated in FIG. 6.

FIG. 9 is a graph 95 of the yaw rate error. The controller 38 can be programmed to detect when the yaw rate error 95 is in excess of an established error threshold that would require correction by the yaw management system. An upper error threshold bar or limit 96 is shown above the zero axis and a lower error threshold bar or limit 97 is shown below the zero axis in FIG. 9. The upper and lower error threshold bars represent the upper and lower limits of error for which no correction to the yaw rate would be required by the management system according to the invention. The yaw management system may change the upper and lower error threshold bars as a function of vehicle speed, steering wheel angle, or other monitored inputs to allow for greater error tolerance where necessary.

The orientation (up vs. down) of the yaw rate error 95 above or below the zero axis is merely an indicator of direction in which a yaw correction is required. For example, during the left turn illustrated in FIG. 6, a negative yaw rate error exceeding the lower error threshold bar 97 would indicate that extra torque should be applied to the right rear wheel to adjust the yaw rate. In the same left turn, if there occurred a yaw rate error that exceeded the upper error threshold bar 96, this would indicate that extra torque should be applied to the left rear wheel to properly adjust the yaw rate. Yaw rate error that falls between the upper and lower threshold bars would be considered tolerable yaw rate error that requires no correction by the yaw management system.

Referring now to FIG. 9, the yaw rate error is shown to exceed the error threshold bars on three occasions in the turn illustrated in FIGS. 6 through 9. The yaw rate error is noted to be zero at time zero (A) because the vehicle has not yet entered its left turn. As the vehicle enters the turn at time (B), a yaw rate error 95 in excess of the lower error threshold bar 97 is observed, indicating that a correction in yaw rate is required by applying additional torque to the right rear wheel 34 in accordance with the invention. As the vehicle approaches the later part of the turn at time (C), the yaw rate error 95 is in excess of the upper error threshold bar 96. This error may be corrected by the yaw management system by applying additional torque to the left rear wheel 28 in accordance with the invention. As the yaw rate changes again at time (D), the need for a further correction is again indicated by applying torque to the right rear wheel 34. Finally, the approximate decaying sinusoidal pattern of yaw rate error 95 becomes small enough at time (E) that the error falls between the upper and lower error threshold bars 96 and 97. Thus, although yaw rate error exists, it falls within a range of what would be considered tolerable yaw rate error that requires no correction by the yaw management system.

The yaw management system of the invention described above uses the steering wheel angle as input to the controller 38 to determine what must be done to control the torque transfer apparatus 43, 48, 78. In another embodiment of the invention, the speed of the vehicle is used as input to the controller, in conjunction with the yaw rate, to control the torque transfer apparatus 43, 48 or 78. In this embodiment of the invention, the wheel speed sensor 41 senses the speed of the vehicle. This can be accomplished by sensing the speed of the drive wheels, or by any other suitable means. The response to the measured or detected yaw rate is partly a function of the vehicle speed. The controller 38 is programmed to receive information from the yaw sensor 36 and wheel speed sensor 41, for controlling the torque transfer apparatus 43, 48, 78 in response to the information from the yaw sensor 36 and speed sensor 41.

This embodiment of the invention is useful in developing an automatic response from the controller 38 in the event of a vehicle spin. According to this embodiment of the invention, the controller is optionally programmed to allow relatively high yaw rates at low speeds and only relatively low yaw rates at higher vehicle speeds. The controller can optionally be programmed to account for this yaw rate/speed relationship in at least two ways. First, the controller 38 can be programmed to activate the torque transfer apparatus 43, 48, 78 to correct vehicle spin when the yaw rate is unacceptably high for the speed of the vehicle. Second, the controller 38 can be programmed to modify the threshold levels or bars 96, 97 by bringing them closer to the zero yaw rate error line 99 at higher vehicle speeds. Input from the steering wheel angle sensor 40 can also be used with this embodiment of the invention.

The principle and mode of operation of this invention have been described in its preferred embodiments. However, it should be noted that this invention may be practiced otherwise than as specifically illustrated and described without departing from its scope.

What is claimed is:

1. A yaw management system for a vehicle comprising:
a differential including an input shaft that is adapted to be rotatably driven by a source of rotational power of the vehicle and first and second output shafts that are rotatably driven by said input shaft;
first and second axle shafts that are adapted to be respectively connected to first and second driven wheels of the vehicle;
a torque transfer apparatus selectively applying torque from said first output shaft of said differential to said first axle shaft and selectively applying torque from said second output shaft of said differential to said second axle shaft; and
a controller that is responsive to a yaw rate sensor for controlling the operation of said torque transfer apparatus so as to manage an actual yaw rate of the vehicle in accordance with a target yaw rate of the vehicle.

2. The yaw management system defined in claim 1 wherein said controller controls the operation of said torque transfer apparatus when the actual yaw rate of the vehicle exceeds the target yaw rate.

3. The yaw management system defined in claim 1 wherein said controller is responsive to said yaw rate sensor for calculating a yaw rate error of the vehicle, and wherein said controller controls the operation of said torque transfer apparatus when the yaw rate error of the vehicle exceeds an error threshold.

4. The yaw management system defined in claim 1 further including a steering angle sensor for sensing a steering angle of the vehicle, said controller being responsive to both said yaw rate sensor and said steering angle sensor for controlling the operation of said torque transfer apparatus.

5. The yaw management system defined in claim 4 wherein said controller is responsive to both said yaw rate sensor and said steering angle sensor for calculating a yaw rate error of the vehicle, and wherein said controller controls the operation of said torque transfer apparatus when the yaw rate error of the vehicle exceeds an error threshold.

6. The yaw management system defined in claim 1 further including a speed sensor for sensing a speed of the vehicle, said controller being responsive to both said yaw rate sensor and said speed sensor for controlling the operation of said torque transfer apparatus.

7. The yaw management system defined in claim 6 wherein said controller is responsive to both said yaw rate sensor and said speed sensor for calculating a yaw rate error of the vehicle, and wherein said controller controls the operation of said torque transfer apparatus when the yaw rate error of the vehicle exceeds an error threshold.

8. The yaw management system defined in claim 1 wherein said differential is a limited slip differential having a center clutch.

9. The yaw management system defined in claim 1 wherein a first clutch is connected between said first output shaft of said differential and said first axle shaft and a second clutch is connected between said second output shaft of said differential and said second axle shaft.

10. The yaw management system defined in claim 1 wherein said torque transfer apparatus includes a hydraulic system having a hydraulic pump and valve assembly.

11. The yaw management system defined in claim 1 wherein said torque transfer apparatus includes an electronically controlled clutch system having an electronic control unit and electronic actuators for selectively engaging electronic clutches.

12. The yaw management system defined in claim 1 wherein said torque transfer apparatus includes a first clutch selectively applying torque from said differential to said first axle shaft and a second clutch selectively applying torque from said differential to said second axle shaft, said first clutch and said second clutch being disposed within said differential.

* * * * *